Patented Apr. 22, 1952

2,593,888

UNITED STATES PATENT OFFICE 2,593,888

PRODUCTION OF HYDROXYALKYL AMIDES OF ACRYLIC ACIDS

Giffin D. Jones, Easton, Pa., assignor to General Aniline & Film Corporation, New York, N. Y., a corporation of Delaware No Drawing. Application October 16, 1945, Serial No. 622,702

5 Claims. (Cl. 260—561)

The present invention relates to the production of hydroxyalkylamides of α-unsubstituted and α-substituted acrylic acid. More particularly, the invention relates to a new method for producing such hydroxyalkylacrylamides in a high state of purity. Another aspect of the invention relates to polymerizing such monomers to produce polymers and more particularly water-soluble polymers, In one highly advantageous embodiment, the invention relates to the production of N-β-ethanolmethacrylamide in a highly purified state and to the formation of a water-soluble polymer from the monomer.

Attempts to produce N-β-ethanolmethacrylamide have resulted in a product containing various impurities which could not readily be removed from the monomer. One of these impurities is believed to be the cross-linking or netting agent having the following formula:

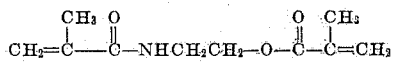

When such an impure monomer is polymerized, a cross-linked polymer is obtained which forms an irreversible gel with water. The gel is water-insoluble and when dried down yields a water-insoluble powder.

It is, accordingly, an object of this invention to produce a pure monomer of hydroxyalkylamides of acrylic acids which are substantially free from cross-linking agents and other impurities.

It is a further object of this invention to convert such purified monomers into polymers and more particularly water-soluble polymers.

It is among the objects of this invention to produce polymers which are readily soluble in water, and which, in particular, have a good protective colloid action for silver halides, are compatible with gelatin silver halide photographic emulsions, and may be used as a gelatin substitute in such emulsions.

It is a further object of this invention to produce polymers having a high peptizing action and which will prevent the sedimentation of finely divided materials such as pigments and silver halide dispersed in aqueous media.

It is also within the scope of this invention to produce interpolymers of the above pure monomers with other polymerizable compounds.

According to my invention, highly pure monomers are obtained by reacting an acrylic acid halide as, for example, acrylic acid chloride or methacrylic acid chloride with an alkylolamine as, for example, ethanolamine or N-methylethanolamine in the presence of a diluent which is a solvent for the alkylolacrylamide formed but with a non-solvent for the by-product, alkylolamine hydrogen halide which is formed during the reaction. As an example of such a diluent, there may be mentioned acetonitrile. It is preferable to add slowly the acrylyl halide dropwise to the alkylolamine which is preferably chilled, thereby maintaining an excess of the latter. In this manner, the formation of any cross-linking agent is reduced to a minimum. It is also preferred to use at least about two mols of the alkylolamine per mol of the acrylyl halide. In this way the excess of the alkylolamine neutralizes the hydrogen halide formed during the reaction. The neutralization results in the formation of an alkylolamine hydrogen halide as a by-product. Thus, the use of another compound as a neutralizing agent, such as sodium hydroxide, is not required.

The use of the diluent of the nature claimed in the reaction facilitates the production of a pure monomer since the monomer is soluble in this solvent, while the by-product, alkylolamine hydrogen halide, precipitates therefrom in crystalline form and may be readily filtered off.

The filtrate may then be further purified by distillation under reduced pressure in the presence of any suitable polymerization inhibitor, such as, for example, hydroquinone, tannic acid, sulfur, cuprous chloride, copper, and camphor sulfonic acid.

The monomers, when polymerized tend to yield an insoluble polymer. However, according to one aspect of my invention, a highly water-soluble polymer can be produced by carrying out the polymerization in bulk, using a suitable polymerization catalyst, as for example, benzoyl peroxide or ultraviolet rays and interrupting the polymerization at an early stage ranging from about 10 to 50% yield of polymer. A water-soluble polymer may also be obtained by carrying out the polymerization in the presence of an organic solvent which confines the molecular weight of the polymer formed to a range where the polymer is water-soluble. This procedure is described in more detail in my copending application Serial No. 622,704, filed October 16, 1945, now Patent Number 2,533,166. Thus, in this manner, a poly-N-β-ethanol methacrylamide was obtained which readily dissolved in water.

In another modification, by carrying out the polymerization of the highly purified monomer in a liquid which is a solvent for the monomer and a non-solvent for the polymer, such as, for example, acetone, or tertiary butyl alcohol even when the polymerization is complete, water-soluble polymers result.

By polymerizing the pure monomer in an alcohol, such as methyl alcohol, a water-soluble polyethanolmethacrylamide resulted. The latter was obtained as a precipitate by treating the methanol solution in which it is soluble by a diluent in which the polymer is insoluble as, for example, acetone.

In another aspect of the invention, the pure monomers may be interpolymerized with other polymerizable compounds. Thus, N-β-ethanolmethacrylamide readily interpolymerizes with methacrylamide and with N-methyl-N-ethanolmethacrylamide. The latter monomer which is within the scope of the present invention cannot be polymerized per se by any of the above methods, but may be polymerized by the method described in my copending application Serial No. 622,701, filed October 16, 1945, now Patent Number 2,508,717. The polymer obtained is water-insoluble.

Illustrative of the novel methods for preparing pure hydroxyalkylacrylamides and water-soluble polymers therefrom are the following examples. The parts are by weight unless otherwise indicated.

Example 1

800 parts (13.06 mol) of ethanolamine (B. P. 80–1° C.) were dissolved in 783 parts of acetonitrile (B. P. 81–82° C.). To this there was slowly added a solution of 680 parts of methacrylyl chloride (B. P. 68–70° C.) in 585 parts of acetonitrile. The reaction mixture was maintained below 5° C. and the addition required 8 hours. The solution was chilled to 0° C. and filtered from the ethanolamine hydrochloride that precipitated in crystalline form. The residue was washed with 156 parts of chilled acetonitrile, the filtrates combined, treated with 5 parts of hydroquinone and stored at −10° C. The solution was distilled under reduced pressure and 40° C. bath temperature. When the last traces of acetonitrile had been removed, 20 parts of hydroquinone were added, and the solution was then distilled at about 0.2 mm. pressure. N-β-ethanolmethacrylamide was obtained in a yield of 65%. The monomer had a boiling point of 130–140° C. at 0.5 mm. pressure and a refractive index of $n_D^{25}$ 1.4988.

Analysis.—Calculated for $C_6H_{11}O_2N$: N, 10.84. Found: N, 10.63.

Example 2

The same procedure was employed as in Example 1 except that smaller quantities were used. 150 parts of N-methylethanolamine (2.0 mol) were dissolved in 156 parts of acetonitrile and there was added dropwise a solution of 104.5 parts of methacrylyl chloride (1.0 mol) in 78.3 parts of acetonitrile. The addition was carried out for a period of 3 hours, the temperature being maintained below 10° C. The solution was then cooled to 0° C. and seeded with N-methylethanolamine hydrochloride. After an hour, 45 parts of the hygroscopic N-methylethanolamine hydrochloride which formed as a crop of crystals were filtered. After distillation at 50° C. bath temperature at 20 mm. pressure and then at 1 mm. pressure, there was obtained 205 parts of a product which did not freeze in "Dry Ice." A portion of this product was distilled. The distillate was N-methyl-N-β-ethanolmethacrylamide which had a boiling point of 0.5 mm. at 110–115° C.; a refractive index of $n_D^{20}$ 1.4842; and a density of $d_4^{20}$ 1.0466.

Analysis.—Calculated for $C_7H_{13}O_2N$: N, 9.78. Found: N, 9.56.

The compound may be represented by the following formula:

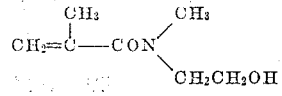

Example 3

5 volumes of the distilled monomer as obtained in Example 1 were sealed in a tube which contained 5 volumes of methanol. The tube was placed under ultraviolet light at room temperature. After a week the contents of the tube were honey-like. The tube was opened and the solution poured into water which dissolved rapidly. The water solution was precipitated in acetone, yielding 2.5 parts of a white powder which was very water-soluble.

Analysis.—Calculated for $(C_6H_{11}O_2N)_x$: N, 10.84. Found: N, 10.91.

Example 4

2.5 parts of distilled monomer obtained as in Example 1 were polymerized as in Example 3 in a sealed tube without the use of any solvent. The tube was opened and the polymer had formed a white solid that was found to be soft due to incomplete conversion of the monomer to polymer. The product dissolved on warming in 10 parts of water and was precipitated in acetone, yielding 0.8 part of a very water-soluble polymer. A 20% solution was readily formed by dissolving 0.7 part in 3.5 parts of water.

Analysis.—Calculated for $(C_6H_{11}O_2N)_x$: N, 10.84. Found: N, 10.64.

Example 5

20 volumes of N-ethanolmethacrylamide were dissolved in 100 volumes of acetone and the solution was irradiated under vacuum at room temperature with ultraviolet light for about 72 hours. A good yield of polymer precipitated which was removed by filtration. The product readily dissolved in water.

Example 6

To a solution of 160 parts of acetonitrile and 122 parts of ethanolamine (2 mols) there was added while cooling below 10° C. over a period of 2 hours a solution of 90.5 parts (1.0 mol) of acrylyl chloride in 80 parts of acetonitrile. The solution was maintained at 10° C. for about 12 hours after which it was filtered from the ethanolamine hydrochloride which had precipitated as crystals. Most of the acetone was then distilled from the filtrate at aspiration pressure, then 2 parts of hydroquinone added as a polymerization inhibitor and the solution distilled at reduced pressure. 40 parts of N-β-ethanolacrylamide was obtained which had a boiling point of 135–140° C. at 1.5 mm., and a refractive index of $n_D^{25}$ 1.5022.

Analysis.—Calculated for $C_3H_9O_2N$: C, 52.2; H, 7.8; N, 12.2. Found: C, 50.37; H, 7.69; N, 11.21.

Example 7

Equal volumes of N-ethanolacrylamide prepared as in Example 6 and methanol were placed in a glass tube and subjected to ultraviolet light at 40° C. The polymerization was interrupted at 30% yield of polymer. The polymer obtained was highly soluble in water.

Example 8

The same procedure was employed as in Example 2, except that there was utilized 150.2 parts (2 mols) of N-methylethanolamine and 90.5 parts (1 mol) of acrylyl chloride. After distillation, 30 parts of N-methyl-N-ethanolacrylamide was obtained. The product had a boiling point of 115–120° C. at 1 mm. It may be represented by the following formula:

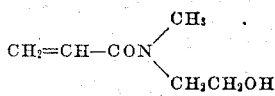

The N-methyl-N-ethanolacrylamide monomer so prepared was polymerized by subjecting it to ultraviolet light at 40° C. for a week. The reaction mass was then diluted with acetone. The polymer separated as an oil. Polymerization could also be effected by heating 1 part of the monomer with 0.01 part of benzoyl peroxide at 140° C. for 24 hours. Again the polymer was separated as an oil when diluting the reaction mass with acetone.

Subjecting the monomeric N-methyl-N-ethanolacrylamide to polymerization at −10° C. with ultraviolet light resulted in a gummy polymer.

*Analysis.*—Calculated for $(C_6H_{11}O_2N)_n$: N, 10.84. Found: N, 10.71.

Example 9

In 4 parts of methanol there were dissolved 3.5 parts of N-ethanolmethacrylamide and 1 part of methacrylamide. The solution was irradiated for 16 days at 40° C. with ultraviolet light. A white interpolymer precipitated which was water-insoluble.

Example 10

A mixture of 2.8 parts of N-ethanolmethacrylamide and 4.2 parts of N-methyl-N-ethanolmethacrylamide were sealed in an evacuated tube and irradiated 16 hours at 40° C. with ultraviolet light. A white gel was formed of a water-insoluble polymer.

It is to be understood that the pure monomers prepared by my process may be utilized to produce water-insoluble polymers and interpolymers by any of the usual polymerizing processes. A distinctly preferred process for producing water-soluble polymers involves polymerizing the monomer sealed in vacuo as it is directly collected from the still. However, the process of producing purified hydroxyalkylamides of acids of the acrylic acid series according to the herein described invention is highly useful and advantageous per se without regard to the particular process for polymerizing the monomer thus obtained.

While acetanitrile has been disclosed as the diluent in the specific examples for producing the alkylolamide monomers, any diluent which is a solvent for the alkylolamide formed but a non-solvent for the by-products, such as the alkylolamide hydrogen halides which may be formed during the reaction are also suitable. A particular feature of my invention, however, is the employment of diluents, such as acetonitrile, in which the alkylolamine hydrogen halides formed in the reaction precipitate in solid or crystalline form.

As suitable acryl halides and α-substituted acryl halides, in addition to the chlorides, may be mentioned the corresponding bromides. In addition to N-β-ethanolmethacrylamide the invention is equally applicable to the N-diethanolmethacrylamide and the corresponding α-propyl, butyl, phenyl, cyclohexyl, and chloro-substituted acrylamides. Likewise, the invention is equally applicable to the production not only of monomeric N-methyl-N-β-ethanolmethacrylamide but to the corresponding N-propyl-, N-butyl-, N-amyl-, N-β-ethanolmethacrylamides. It is likewise effective in the production of corresponding acrylamides in which the alpha-atom in the acrylic acid residue is unsubstituted, as, for example, N-ethanolacrylamide, N-diethanolacrylamide, N-methyl-N-ethanolacrylamide.

The temperature at which the reaction between the acryl halide and the hydroxyalkylamine is carried out may be varied but it is preferred to carry out the reaction at a temperature of about 10° C. or below. The preferred range is from about 0° to about 5° C.

The temperature of polymerization may also be varied, but room temperature or below, using ultraviolet light, is preferred when it is desired to obtain water-soluble polymers. However, temperatures as low as −30° C. may be utilized but polymerization proceeds slowly. A suitable range is from about 0°–25° C.

The above detailed description and examples are intended to be only illustrative of the invention. It is to be understood that such modifications or variations therefrom which come within the spirit of the invention are intended to be included within the scope of the claims.

I claim:

1. A method of producing a substantially pure N-(hydroxyalkyl)amide of an acid selected from the class consisting of acrylic acid, α-methyl-, α-propyl-, α-butyl-, α-cyclohexyl-, α-phenyl- and α-chloroacrylic acids, which comprises adding an acid halide of an acid of the aforesaid class to an excess of an amide-forming alkylolamine in solution in a sufficient amount of acetonitrile to dissolve the N-(hydroxyalkyl)amide formed in the reaction, but which is a non-solvent for the alkylolamine hydrogen halide formed in the reaction, and separating the resulting acylation product from the reaction mixture.

2. A method of producing a substantially pure N-(hydroxyalkyl)amide of an acid selected from the class consisting of acrylic acid, α-methyl-, α-propyl-, α-butyl-, α-cyclohexyl-, α-phenyl- and a α-chloroacrylic acids, which comprises slowly adding 1 mol of an acid halide of an acid of the aforesaid class to 2 mols of an amide-forming alkylolamine dissolved in a sufficient amount of acetonitrile to dissolve the N-(hydroxyalkyl)-amide formed in the reaction, and separating the resulting acylation product from the reaction mixture.

3. A process for producing substantially pure N-β-ethanolmethacrylamide, which comprises slowly adding 1 mol of methacryl chloride to 2 mols of ethanolamine dissolved in a sufficient amount of acetonitrile to dissolve the N-β-ethanolmethacrylamide formed, and separating the acylation product from the reaction mixture.

4. A process for producing substantially pure N-methyl-N-β-ethanolmethacrylamide, which comprises slowly adding 1 mol of methacryl chloride to 2 mols of N-methylethanolamine dissolved in a sufficient amount of acetonitrile to dissolve the N-methyl-N-β-ethanolmethacrylamide formed, and separating the acylation product from the reaction mixture.

5. A process for producing substantially pure N-methyl-N-β-ethanolacrylamide, which comprises slowly adding 1 mol of acrylyl chloride to 2 mols of N-methylethanolamine dissolved in a sufficient amount of acetonitrile to dissolve the N-methyl-N-β-ethanolacrylamide formed, and separating the acylation product from the reaction mixture.

GIFFIN D. JONES.

REFERENCES CITED

The following references are of record in the file of this patent:

UNITED STATES PATENTS

| Number | Name | Date |
|---|---|---|
| 1,990,453 | Hund et al. | Feb. 5, 1935 |
| 2,017,537 | Hoffmann et al. | Oct. 15, 1935 |
| 2,238,928 | Cahn et al. | Apr. 22, 1941 |
| 2,311,548 | Jacobson et al. | Feb. 16, 1943 |

FOREIGN PATENTS

| Number | Country | Date |
|---|---|---|
| 450,692 | Great Britain | July 23, 1936 |
| 447,750 | Belgium | Nov. 30, 1942 |

OTHER REFERENCES

Abstract in "Chemical Abstracts," vol. 39, p. 1000.